United States Patent [19]

Budecker

[11] Patent Number: 4,930,994
[45] Date of Patent: Jun. 5, 1990

[54] RADIAL PISTON PUMP

[75] Inventor: Ludwig Budecker, Frankfurt am Main, Fed. Rep. of Germany

[73] Assignee: Alfred Teves GmbH, Frankfurt am Main, Fed. Rep. of Germany

[21] Appl. No.: 22,795

[22] Filed: Mar. 6, 1987

[51] Int. Cl.$^5$ .............................. F04B 23/04
[52] U.S. Cl. ................... 417/286; 417/301; 417/429; 417/462
[58] Field of Search ............... 417/429, 301, 286, 462; 91/492, 498

[56] References Cited

U.S. PATENT DOCUMENTS

| 2,268,695 | 1/1942 | Carlson | 417/301 |
| 2,712,794 | 7/1955 | Humphreys | 91/485 |
| 2,813,492 | 11/1957 | Berlyn | 91/492 |
| 2,968,915 | 1/1961 | Feistel | 417/428 |
| 3,187,681 | 6/1965 | Firth et al. | 91/498 |
| 3,433,124 | 3/1969 | Parrett | 91/501 |
| 3,723,026 | 3/1973 | Soyland | 417/286 |
| 3,751,190 | 8/1973 | Cecchi | 417/428 |
| 4,043,255 | 8/1977 | Cunningham | 92/158 |
| 4,269,352 | 5/1981 | Przystaunk | 417/428 |
| 4,445,825 | 1/1984 | Budecker | 417/462 |
| 4,594,939 | 6/1986 | Van Os | 92/169 |
| 4,685,747 | 8/1987 | Belart et al. | 303/114 |

FOREIGN PATENT DOCUMENTS

| 211540 | 6/1957 | Australia | 417/301 |
| 2436321 | 2/1976 | Fed. Rep. of Germany . | |
| 2952101 | 6/1981 | Fed. Rep. of Germany | 417/462 |
| 3121531 | 1/1983 | Fed. Rep. of Germany | 417/462 |
| 787502 | 9/1935 | France | 417/301 |
| 1154019 | 4/1958 | France . | |
| 562368 | 6/1944 | United Kingdom . | |
| 597228 | 1/1948 | United Kingdom . | |
| 850783 | 10/1960 | United Kingdom . | |

Primary Examiner—Leonard E. Smith
Attorney, Agent, or Firm—Robert P. Seitter

[57] ABSTRACT

An electric motor driven radial piston pump for a motor vehicle brake system with slip control is disclosed wherein the radial piston pump includes two parallel working circuits drivable by the drive motor. The working pressure of the first working circuit is limited to a preset value. Above the preset value only the second working circuit is effective.

7 Claims, 2 Drawing Sheets

RADIAL PISTON PUMP

BACKGROUND OF THE INVENTION

The present invention relates to an electric motor driven radial piston pump for use in a motor vehicle with brake slip control.

A radial piston pump of this kind is disclosed in the German patent specification DE-OS No. 32 19 513. If such a pump is to be used in a motor vehicle brake system having slip control, a relatively high delivery rate of the pump is required in the low braking pressure range. This requirement leads to high power consumption of the electric drive motor, whereas higher pressures require lower delivery rates.

SUMMARY OF THE INVENTION

The object of the present invention is to provide for a radial piston pump which provides for lower power consumption.

This object is achieved according to the present invention wherein a radial piston pump is provided with two parallel working circuits drivable by the same drive motor and wherein the working pressure of the first working circuit is limited to a preset value.

According to the invention, the two working circuits jointly assure the high delivery rate required in the low pressure range. When the preset working pressure of the first working circuit is exceeded, the second working circuit alone provides the entire delivery rate. Advantageously, since the effective delivery rate of the first working circuit is zero above the preset working pressure, the power consumption due to the first working circuit decreases so that the total power consumption increases at a lower rate as the pressure increases.

According to an important feature of the invention, a throttle channel is arranged between the pressure side and the suction side of the first working circuit.

According to an important feature of the invention, a throttle channel is arranged between the pressure side and the suction side of the first working circuit.

According to another important feature, a check valve is arranged between the pressure side of the first working circuit of the throttle channel and the connecting point on the pressure side of the two working circuits. Advantageously, the throttle channel provides means for gradually reducing the output pressure of the first working circuit towards the suction side as the output pressure increases. Initially, only part of the pressure fluid flows back to the suction side through the throttle channel when the pressure is low, whereas as the pressure increases the entire pressure fluid finally flows back from the pressure side of the first working circuit is its suction side. Accordingly, the first working circuit no longer contributes to the effective total delivery rate. In order to assure that, from the moment the preset limit value of the first working circuit is reached, the pressure fluid does not flow back the output side of the second working circuit through channel of the first working circuit to the latter's suction side, the check valve shuts off the connection from the first working circuit to the second working circuit.

According to an important feature of the invention, the throttle channel is a clearance space of a preset width between a piston and cylinder wall of the first working circuit.

A still further important feature of the invention provides for the check valve to be arranged in a channel in a control journal on which the pump motor is rotatably mounted. The two working circuits are connected together dependant on the angle of rotation of the rotor which is common to both working circuits.

According to another embodiment, a valve is arranged on the suction side of the first working circuit which is switchable from its open position to its closed position at a preset output pressure of both working circuits. When the valve closes upon reaching the preset output pressure of the first working circuit, the second working circuit cannot take in any more working fluid. Thus, the delivery rate of the first working circuit is completely interrupted and the power consumption of the drive motor is further reduced.

According to the invention, the pressure-controlled valve is a check valve on which the suction pressure of the first working circuit operates in its opening direction. Below the preset output pressure, the check valve is opened automatically by the suction pressure of the first working circuit.

Advantageously, each piston of the first working circuit is in the shape of a ball and the second working circuit includes at least one cylinder having one ball-shaped piston and one cylindrical piston. A ball-shaped piston has the advantage that, if the throttle channel is designed as a clearance between the piston and cylinder, the flow through the throttle channel is largely independent of the viscosity of the liquid used as the working fluid. The combination of ball and cylindrical piston in the second working circuit on the other hand assures fluid tightness between the piston and cylinder and thus allows high working pressures to build up.

BRIEF DESCRIPTION OF THE DRAWINGS

The present invention is described in detail below with reference to the accompanying drawings in which.

DETAILED DESCRIPTION OF THE PREFERRED EMBODIMENT

Figure 1:
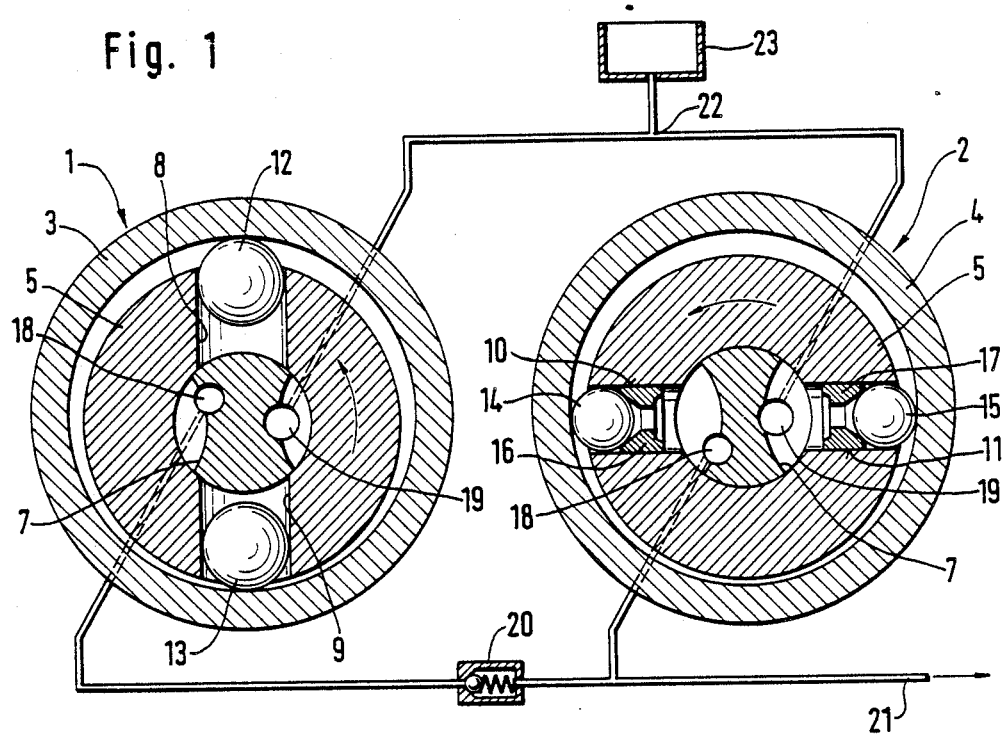
FIG. 1 is a diagrammatic view of a two-circuit radial piston pump according to the invention.
Figure 3:
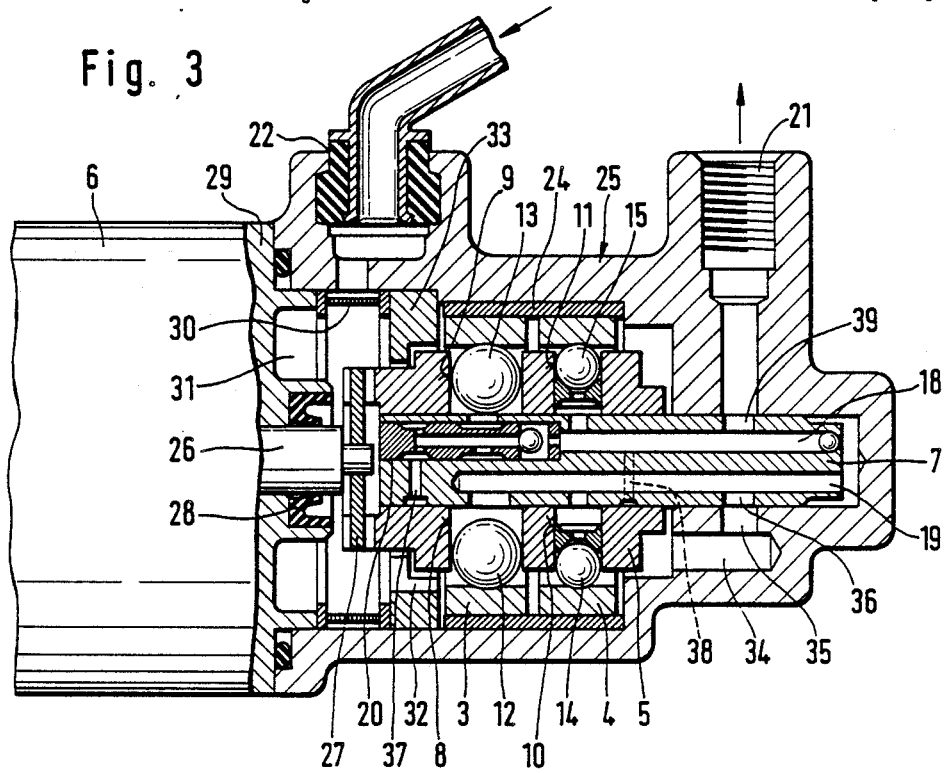
FIG. 3 is a cross sectional view of the two-circuit radial piston pump according to the invention showing details of construction.

Shown in FIGS. 1 and 3 is a radial piston pump according to the invention, including a first working circuit 1 and a second working circuit 2. Both working circuits 1 and 2 have a common stator including cam rings 3 and 4 and a common rotor 5 which is driven by an electric motor 6 as shown in FIG. 3. The rotor is rotatably mounted on a control journal 7 which is common to both working circuits. The cam rings 3, 4 are disposed eccentrically relative to the control journal 7 and to the rotor 5. In each working circuit 1 and 2 the rotor 5 is provided with two diametrically opposed cylinders 8, 9 and 10, 11, respectively. Each cylinder pair is formed as two continuous aligned radial bores. The cylinder pair 8, 9 is orientated from the pair 10, 11 by 90 degrees. Each cylinder 8, 9, 10, 11 accommodates a piston 12, 13, 14, 15 shaped as a ball. The cylinders 10 and 11 each include an additional cylindrical piston 16 and 17 which are shaped as a sleeve having a conical seat for receiving the ball-shaped pistons 14 and 15.

The cylinders 8 and 9 and the ball-shaped pistons 12 and 13 have a large diameter than the cylinders 10 and 11 and the corresponding pistons 14, 15, 16 and 17.

Between the ball-shaped pistons 12 and 13 and the inside wall of their cylinders 8 and 9, there is a clearance space of preset width which forms a throttle channel connecting the pressure of the working circuit with the suction side of the working circuit 1. The pistons 14, 15, 16 and 17, on the other hand, are largely fluid-tight and slidingly mounted in the cylinders 10, 11.

The control journal 7 is provided with two channels 18 and 19 in the form of parallel bores. One portion of the channel 18 associated with the working circuit 1 is disposed on the pressure side of the working circuit 1 and is connected by a check valve 20 with a portion of the channel 18 associated with the pressure side of the working circuit 2 and is also connected with an outlet port 21. The channel 19,. however, is in constant communication with an inlet port 22 disposed on the suction side, which inlet port 22 in turn communicates with a reservoir 23 for a brake pressure fluid.

The check valve 20 shuts off in the direction of the pressure side of the working circuit 1.

As FIG. 3 shows in more detail, the cam rings 3 and 4 are mounted in a stator ring 24 which is mounted in a stator housing 25. The electric drive motor is flanged coaxially to the rotor 5. The shaft 26 of the drive motor 6 is connected with the rotor 5 by means of a coupling 27 and is sealed at the housing 29 of the drive motor 6 by means of a packing 28 in the form of a radial packing ring. The inlet port 22 communicates by way of ring-shaped filter 30 with an inlet chamber 31, which in turn communicates by way of an opening 32 in a retaining ring 33 and the clearances between the rotor 5 and the cam rings 3, 4 and an adjoining longitudinal bore 34 and radial bores 35 and 36 in the control journal 7 with an axial channel 19 of the control journal 7.

The channels 18 and 19 are also alternately connectable with the cylinders 8, 9, 10 and 11 by way of radial bores by rotation of the rotor 5. The channel 18 includes the check valve 20 and communicates through radial channels 37 and 38 with the bearing surfaces between the rotor 5 and the control journal 7 for the purpose of lubricating the connection. The channel 18 is connected through a radial bore 39 with the outlet port 21.

Figure 2:
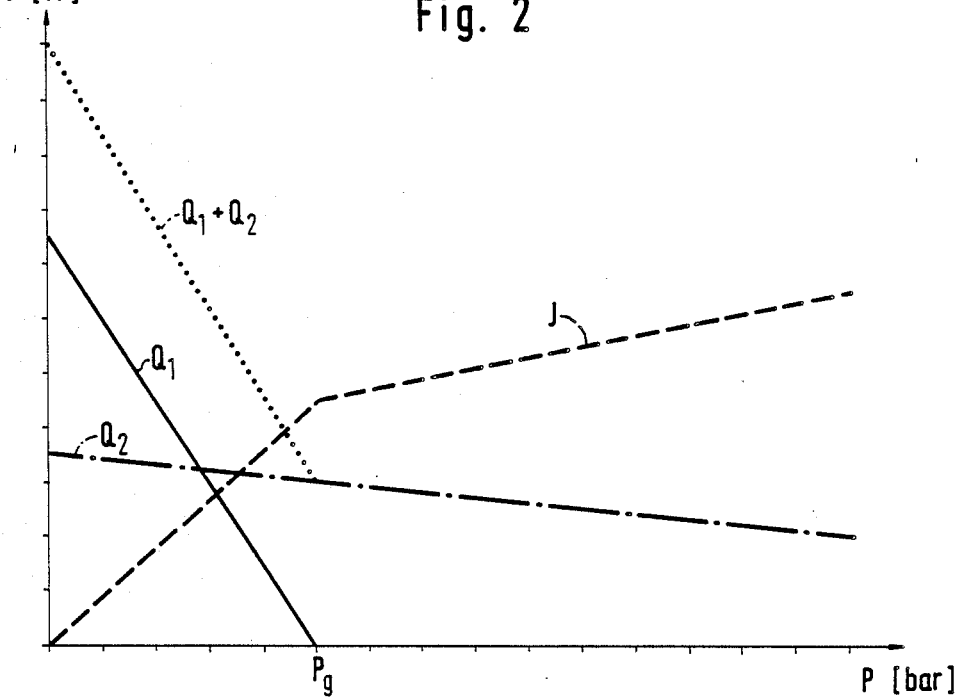
FIG. 2 is a diagram of the individual delivery rates of the two working circuits and the total delivery rate of the pump as well as a diagram of the working power of the drive motor of the two-circuit radial piston pump according to the invention as a function of the working pressure P and/or the load.

During operation of the two-circuit pump according to FIGS. 1 and 3, the delivery rates $Q_1$ and $Q_2$ of the two working circuits 1 and 2, as shown in FIG. 2, decrease linearly as the output pressure P or the load of the pump increases, the delivery rate $Q_1$ of the working circuit 1 is initially higher than the delivery rate $Q_2$ of the working circuit 2. The delivery rate $Q_1$ of the working circuit 1, however, decreases faster than the delivery rate $Q_2$ of the working circuit 2, because the working circuit 1 conveys the pressure fluid through the throttle channel, as defined by the piston to cylinder wall clearance space, back to the suction side. The total delivery rate $Q_1 + Q_2$ of both working circuits 1 and 2 therefore also decreases according to the dotted line in FIG. 2. Upon reaching a preset value $P_g$, the working circuit 1 conveys the entire pressure fluid back through the throttle channel. The delivery rate $Q_1$ above the value $P_g$ therefore is zero, while the total delivery rate $Q_1 + Q_2$ equals the delivery rate $Q_2$ due solely to the working circuit 2. At this point in the operation the check valve 20 is closed so that the working circuit 2 cannot convey any pressure fluid through the working circuit 1 to the suction side. Up to the pressure limit value $P_g$, at which the delivery rate $Q_1$ of the working circuit 1 reaches zero, the operating current J of the drive motor 6 increases at constant speed as the pressure P increases. Upon exceeding the pressure limit value $P_g$, however, the increase of the operating current J is lower, as is shown by the dashed line in FIG. 2. The lower rate of increase of the operating current J is a result of the decreasing speed of the drive motor 6 as the load of the working circuit 2 increases due to the cessation of delivery by the working circuit 1.

Thus, the two-circuit pump described has a relatively high delivery rate $Q_1 + Q_2$ in the low pressure range, and a relatively low delivery rate in the high pressure range, as is particularly desirable in brake systems with slip control (antiskid brake systems).

Figure 4:
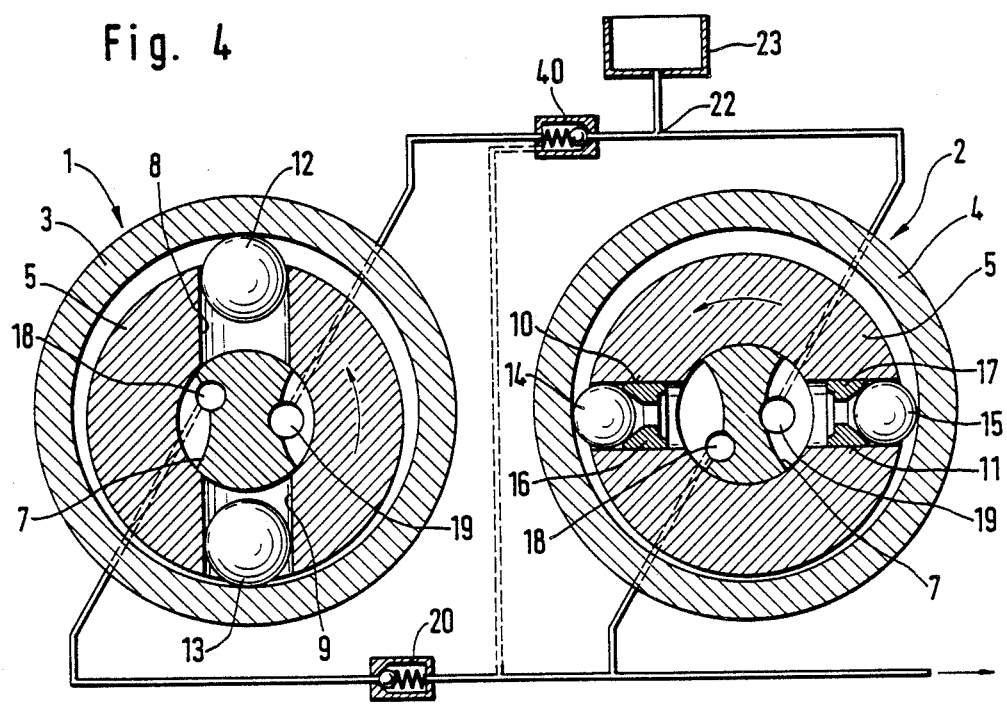
FIG. 4 is a diagrammatic view of an alternative embodiment of a two-circuit radial piston pump according to the invention.

The embodiment shown in FIG. 4 differs from the embodiment illustrated in FIGS. 1 and 3 only in that on the suction side of the first working circuit a valve 40, such as a check valve, which is switchable in dependance on the output pressure of both working circuits is arranged between the inlet port 22 and the inlet channel 19. The check valve 40 shuts off in the direction of the reservoir 23 upon reaching a preset output pressure lower than the value $P_g$ according to FIG. 2, so that the working circuit 1 cannot take in brake fluid from the reservoir 23 and the delivery rate of the working circuit 1, independent of any tolerances of the throttle channel, is completely interrupted at a precisely defined value of the output pressure.

What is claimed is:

1. A combination radial piston pump and electric drive motor, said piston pump having an inlet and an outlet, first and second parallel working circuits between said inlet and said outlet, said first working circuit having a first pumping means coupled to said drive motor for delivering fluid at a first delivery rate from said inlet to said outlet, said second working circuit having a second pumping means coupled to said drive motor for delivering fluid at a second delivery rate from said inlet to said outlet, each of said pumping means having a suction side communicating with said inlet and a pressure side communicating with said outlet, and a throttle channel between the suction and pressure sides of said first pumping means for diverting flow from the pressure side to the suction side of said first pumping means in dependence on the pressure at said outlet and for diverting all such flow at a present pressure at said outlet.

2. The combination radial piston pump and drive motor as defined in claim 1, wherein a check valve is arranged between the pressure side of the first and second pumping means, said check valve being operable to shut off in a direction toward the first pumping means to stop flow from said second pumping means to said first pumping means above said preset value.

3. The combination radial piston pump and drive motor as defined in claim 2, wherein a rotor coupled to said drive motor is rotatably mounted on a control journal and said check valve is arranged in a channel in the control journal, said channel connects the two working circuits together dependent on the angle of rotation of the rotor.

4. The combination radial piston pump and drive motor as defined in claim 2, wherein the first pumping means includes at least one cylinder and one piston in said at least one cylinder, and said throttle channel is a preset clearance space between said piston and said cylinder wall.

5. The combination radial piston pump and drive motor as defined in claim 4 wherein said piston in the at least one cylinder of said first pumping means is ball-shaped, and said second pumping means includes at least one cylinder and one ball-shaped piston and one cylindrical piston each disposed in said at least one cylinder of said second pumping means.

6. The combination radial piston pump and drive motor as defined in claim 1 further including a pressure controlled valve arranged on the suction side of the first pumping means, said pressure controlled valve being switchable from an open position to a closed position by a preset output pressure of both of said working circuits.

7. The combination radial piston pump and drive motor as defined in claim 6, wherein the pressure-controlled valve is a check valve on which the suction pressure of the first pumping means operates in an opening direction of said valve.

* * * * *